US010635855B1

(12) United States Patent
Schroeder et al.

(10) Patent No.: US 10,635,855 B1
(45) Date of Patent: Apr. 28, 2020

(54) CODE COMMENT MARKUP

(71) Applicant: SAP SE, Walldorf (DE)

(72) Inventors: Axel Schroeder, Dresden (DE); Martin Knechtel, Dresden (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/214,618

(22) Filed: Dec. 10, 2018

(51) Int. Cl.
| | | |
|---|---|---|
| *G06F 9/44* | (2018.01) |
| *G06F 40/169* | (2020.01) |
| *G06F 8/73* | (2018.01) |
| *G06F 40/103* | (2020.01) |
| *G06F 40/171* | (2020.01) |
| *G06F 40/117* | (2020.01) |
| *G06F 16/958* | (2019.01) |
| *G06F 16/80* | (2019.01) |

(52) U.S. Cl.
CPC .............. *G06F 40/169* (2020.01); *G06F 8/73* (2013.01); *G06F 40/103* (2020.01); *G06F 40/117* (2020.01); *G06F 40/171* (2020.01); *G06F 16/80* (2019.01); *G06F 16/958* (2019.01)

(58) Field of Classification Search
CPC ...... G06F 17/21; G06F 17/211; G06F 17/241; G06F 8/33; G06F 8/73; G06F 40/171; G06F 40/117; G06F 40/00; G06F 16/80; G06F 16/958; G06F 40/169
See application file for complete search history.

(56) References Cited

U.S. PATENT DOCUMENTS

| | | | | |
|---|---|---|---|---|
| 6,009,441 A | * | 12/1999 | Mathieu | ................... G06F 17/21 715/236 |
| 8,739,121 B1 | * | 5/2014 | Jones | ......................... G06F 8/73 717/110 |
| 9,405,739 B1 | * | 8/2016 | Nguyen | ..................... G06F 8/33 |
| 2003/0237046 A1 | * | 12/2003 | Parker | ................... G06F 17/211 715/234 |
| 2006/0282819 A1 | * | 12/2006 | Graham | ................. G06F 17/241 717/113 |
| 2016/0070686 A1 | * | 3/2016 | Yu | .......................... G06F 40/171 715/230 |

* cited by examiner

*Primary Examiner* — Tuan A Vu
(74) *Attorney, Agent, or Firm* — Buckley, Maschoff & Talwalkar LLC

(57) ABSTRACT

A method and system including a code comment module; a unified code processor in communication with the code comment module and operative to execute processor-executable process steps to cause the system to: receive initiation of an integrated development environment program; receive at least one element; initiate an editor in response to the received at least one element; receive a markup annotation, wherein the markup annotation is associated with the received at least one element; receive one or more comments to be formatted by the received markup annotation; and display the at least one element and the formatted comment. Numerous other aspects are provided.

20 Claims, 9 Drawing Sheets

```
//Analyze data —102
code line A
//Process data —102
code line B
code line C
code line D
//Output data
code line E
code line F
```

FIG. 1A
(PRIOR ART)

```
//Analyze data —102
code line A
//Process data —102
code line B
// more explanation on code line C —104
code line C
/* more details about possible —104
*implications of correct use of
*code line D
*/
code line D
//Output data
// more explanation on code line E and F
code line E
code line F
```

```
// === Analyze Data ===
code line A ──202
// === Process Data ===
code line B ──202
// more explanation on code line C ──204
code line C
      ⎧ /* more details about possible implications of correct use of
      ⎪  * code line D, such as:
 204 ⎨  * * bullet point 1
      ⎪  * * bullet point 2
      ⎩  */
code line D
 204 { // === Output Data ===
      // "more explanation" on code <s>line E</s> and F
code line E
code line F
```

FIG. 2B

```
// Analyze Data ──204
code line A
// Process Data
code line B
// more explanation on code line C
code line C
/* more details about possible implications of correct use
 * of code line D, such as:
 * * -bullet point 1
 * * -bullet point 2
 */
code line D
// Output Data
// more explanation on code line E and F
code line E
code line F
```

```
 97   /**
 98    * == Parsing & IO ==
 99    * @JSON, @REST, @PARSING    ⌐612
100    */                      ⌐610
101   Code Line A
102   Code Line B
```
600

FIG. 6A

```
 97   | PARSING & IO
 98   | JSON REST PARSING  ⌐652
 99   |
100   |
101   Code Line A
102   Code Line B
```
650

FIG. 6B

CODE COMMENT MARKUP

BACKGROUND

When software developers produce source code to implement a particular functionality in a piece of software, they may include comments in the source code. The comments may add some pretext to the source code so that other software developers may understand why a particular line of source code was implemented in the particular way. However, source code comments for different purposes may be mixed (e.g., some comments define a structure, while other comments explain the actual context), and are displayed the same way. Since all comments are treated equally, it may be difficult for the software developer to identify information they are looking for.

Systems and methods are desired which support efficient inclusion of comments in source code.

BRIEF DESCRIPTION OF THE DRAWINGS

FIGS. 1A and 1B are a user interface according to the prior art.

FIGS. 2A and 2B are a user interface according to some embodiments.

FIGS. 6A and 6B are a user interface according to some embodiments.

DETAILED DESCRIPTION

Figure 3:
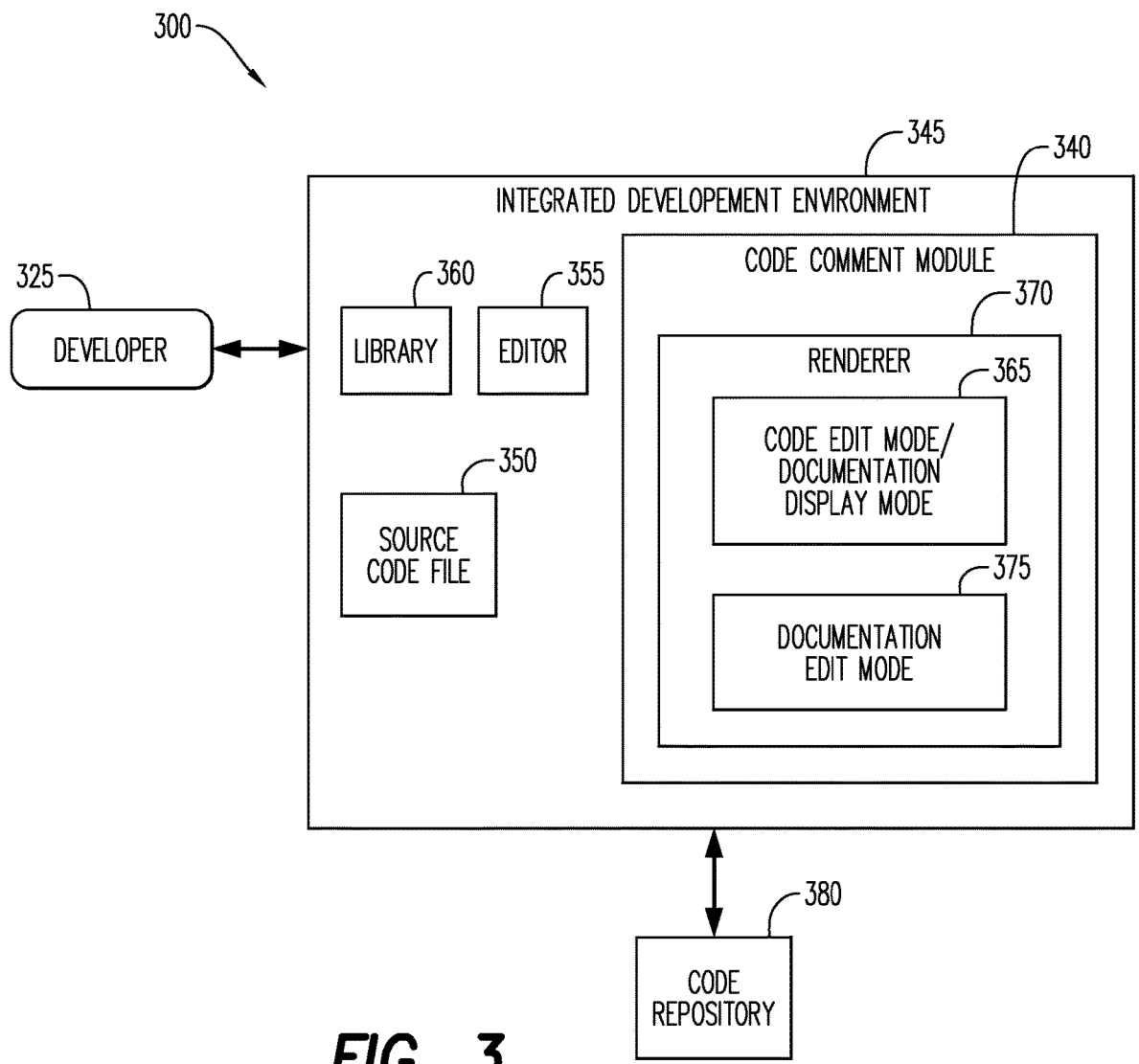
FIG. 3 is a block diagram of a system architecture according to some embodiments.
Figure 4:
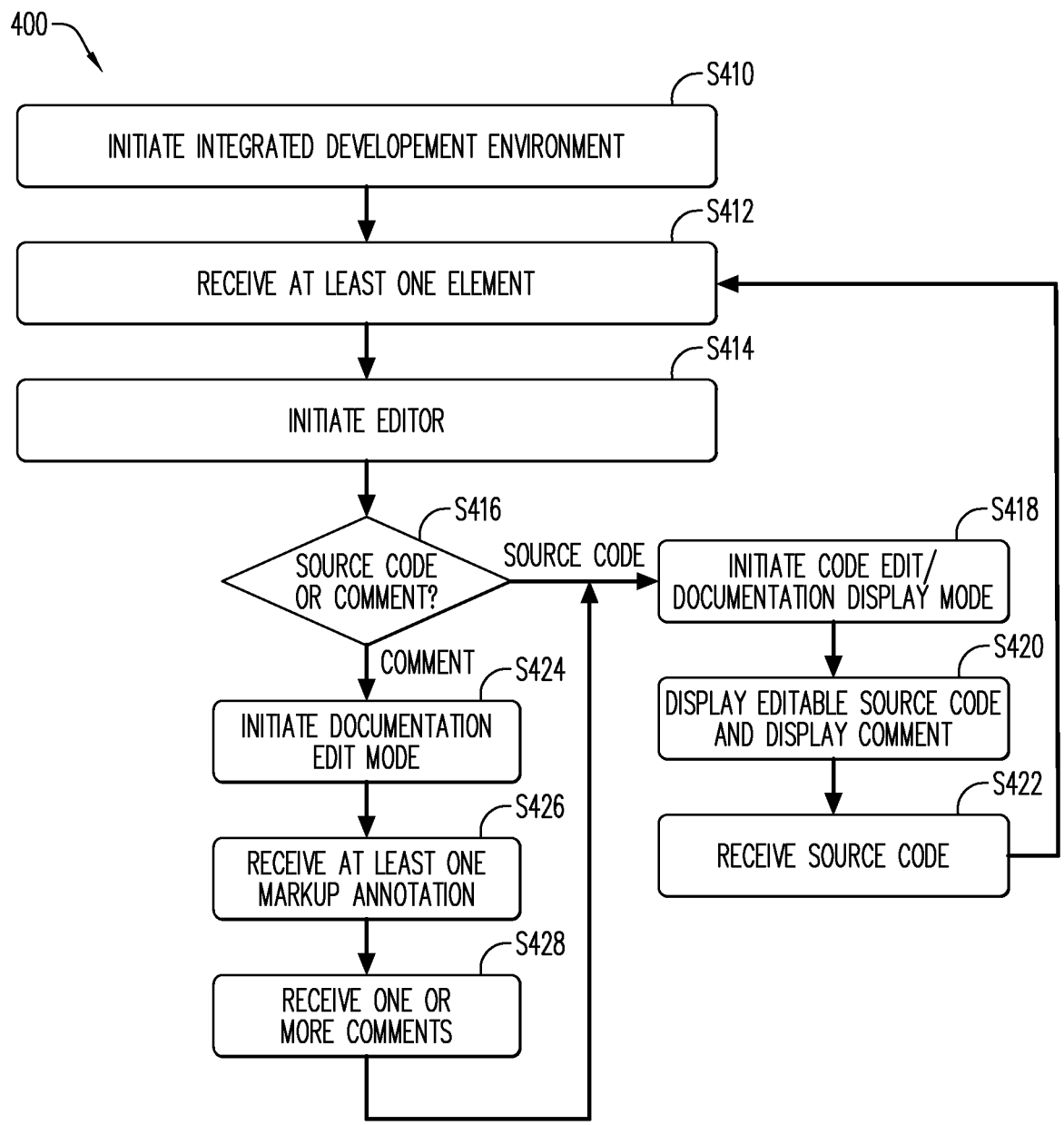
FIG. 4 is a flow diagram according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Software developers may add comments to the source code to at least one of: describe details/complexity of the source code, to better explain the parts of the source code that may not be obvious to other developers; and describe the code structure (e.g., to group sections together so that every developer may quickly read through the code and find the spot they are looking for). When viewing conventional source code with comments together, they may look like a large text document where the formatting has been removed. As such, distinguishing the different code comments may be difficult when different types of information are all equally encoded as code comment. For example, comments may typically be displayed in a different color or font, as prepared by a code editor, as compared to the source code, but the different types of comments are all displayed in the same manner. As it becomes harder to quickly spot relevant parts, looking through the document becomes very time consuming. It is noted that in more mature software, software developers may even find more documentation (e.g., comments) than actual lines of source code.

While the different types of comments may be difficult to discern, there are conventional characters a software developer ("developer") may use to indicate a type of comment. For example, in some langauges (C++, Java®, JavaScript®, etc.) developers may use two different types of comments to better explain workflows, algorithms and any core principles in their programming code. Such types of comments are: 1. /* block comment*/—which may be used to add multi-line descriptions, and 2. //single line text—which may be used to add single line descriptions. It is noted that in other languages, other characters, e.g. the colon in SQL, hashtag in Shellscripting, semicolon in Assembly, period in Windows Batch-Skripting, etc. may be used to introduce comments, which may be equivalent with // in the aforementioned languages. Irrespective of the programming language used, the comments appear as plain text within the source code.

Turning to FIGS. 1A and 1B, prior art examples of source code comments are provided. In FIG. 1A, the comments 102 (e.g., //Analyze data, //Process data, //Output data) may describe a code structure/workflow and may contextually belong together. Other comments 104, as shown in FIG. 1B may eventually be mixed in with the comments in FIG. 1A, as they describe certain code aspects in detail about, for example, limitations of used libraries, compatibilities, other workflows or anything else that may need to be explained. FIG. 1B includes comments adding functional details, mixed in with structuring comments. As shown in FIG. 1B, the comments and their meaning may be difficult to discern as they are unstructured and appear to be equally prioritized.

Some Integrated Development Environments (IDE) provide two markups: "TODO" (i.e., bold printed "TO-DO") and "FIXME" (i.e., bold printed warning) to allow spotting associated lines more easily, and to filter the code based on these markups. However, these markups are temporary comments as they describe work in progress, which may be not yet part of the code or changes planned for the near future. Additionally, these two markups are tied to their specific purpose, and cannot be used to otherwise structure the documentation.

As used herein, the terms "software developer", "developer" and "programmer" may be used interchangeably. Also, the terms "computer code", "code", "source code" and "programming code" may be used interchangeably.

Embodiments provide a code comment module to introduce markup language support within code comments across all programming languages. In computer text processing, markup language is a system for annotating a document in a way that is syntactically distinguishable from the text. Markup language is designed for the processing, definition, and presentation of text. The markup language specifies code for formatting, both the layout and style within a text file. It also specifies the type of content, e.g. "what follows is the name of a $3^{rd}$ party library"<library>Spring</library> so that the documentation system may e.g. display all used libraries with italic font and display Spring in this case. The code used to specify the formatting is called "tags". HTML and XML are examples of markup languages. The use of the code comment module to render the markup language support within the comments may tremendously improve comment readability for developers. The improved comment readability may save time, as well as may avoid errors and miscommunications that may occur when a developer misses a comment in the text, (e.g., as with conventional comments), thereby making the source code development process more efficient. It is also noted that text with markup may also be easier navigated, e.g. by listing all $3^{rd}$ party libraries described in the documentation. Every item in the list may be a hyperlink to jump to the point where this library has been described. That way, enabling more sophisticated navigation and search of documentation.

Embodiments also provide for the code comment module to display the comments in at least two different display modes. A first display mode may show the plain comment including the markup. The second display mode may show the interpreted markup. In embodiments, the code comment module may switch to the first mode whenever the developer is placing his cursor into the documentation in order to edit it. The second mode is displaying the rendered easy to read text when the developer is reading through the documentation without the intent to edit anything. In embodiments, the code comment module may automatically detect if the developer is currently editing a code comment, and may automatically replace this comment with a respective markup syntax.

For example, FIGS. 2A and 2B show a source code file 200 including code 202 and comments 204. The developer 325 (FIG. 3) has used a markup editor of the code comment module to add structure to comments. FIG. 2A shows the source code file in documentation editing mode. All markup is displayed in plain text. For instance "===Title===" indicating a title that will be rendered to bold large text in FIG. 2B showing the source code file in documentation display mode. It is noted that the markup, e.g. "===" shown in FIG. 2A is the difference between what is shown in FIG. 2A and the prior art FIG. 1B. In FIG. 2B, the code comment module detected that the developer finished editing the documentation, interpreted the markup, and replaced the comment with marked-up syntax. For example, "Analyze Data" in FIG. 2B is bold and a larger font as compared to "Analyze Data" in FIG. 2A.

It is also noted that, conventionally, a development team may also document the concept of the software via diagrams, figures and pure text to describe a concept of the software at a higher level than the specific lines of source code. This development document may be separate from the code comments. Conventionally, the code comments may be at a lower level, and structured to state the input and output parameters in a technical manner. The conventional development team document, on the other hand, describes an overall architecture description and/or a detailed description of different steps in the code.

Embodiments may provide a module to unify the code comments and the development team documentation such that they are renderable in the development environment. The combination of the code comments and development team documentation may provide access to different levels of detail as-needed/desired so that a user may review the software on a higher level and/or drill-down in other levels to see more specific details. Embodiments provide for the user to be able to drill up and drill down in a single document, as needed, to analyze the code and comments.

FIG. 3 is a block diagram of system architecture 300 according to some embodiments. The architecture includes a developer 325 operating a local computer, in some embodiments. The developer runs an Integrated Development Environment (IDE)/Code Editor 345, which accesses a code repository 380 in a local file system (e.g., Github, copy on local disc, in sync with a remote server). The IDE 345 may also include an editor 255 and a library 360. Embodiments are not limited to architecture 300.

The code comment module 340 may introduce markup language support within code comments across all programming languages. The code comment module 340 may include a renderer 370. The code comment module 340 may display the comments in different display modes—a code edit/documentation display mode 365 and a documentation edit mode 375. In one or more embodiments, the renderer 370 may decide which mode to display. In the documentation edit mode 375, the plain comment including the markup may be displayed; while in the code edit/documentation display mode 365, the interpreted markup may be displayed.

FIGS. 4-8 include a flow diagram of a process 400 (FIG. 4) for creating and editing a source code file 350 according to some embodiments. Process 400 may be executed by the application server 330 according to some embodiments. In one or more embodiments, the application server 330 may be conditioned to perform the process 400, such that a processor 910 (FIG. 9) of the system 300 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interfaces 500, 550, 600, 700, 800 (FIGS. 5A/B, 6A/B, 7, 8) may be presented on any type of display apparatus (e.g., desktop monitor, smartphone display, tablet display) provided by any type of device (e.g., desktop system, smartphone, tablet computer). One or more embodiments may include a UI renderer (not shown) which is executed to provide user interface 500, 550, 600, 700, 800 and may comprise a Web Browser, a standalone application, or any other application. Embodiments are not limited to user interface 500, 550, 600, 700, 800 of FIGS. 5A/B, 6A/B, 7, 8.

Initially, at S410, initiation of an integrated development environment (IDE) program 345 is performed. As used herein, the terms "IDE" and "code editor" may be used interchangeably. The developer 325 may access the code editor 345 via any suitable interface. Some non-exhaustive examples of code editors include, but are not limited to Eclipse, IntelliJ, Visual. It is noted that embodiments may be used with any code editor, as the code comment module may be integrated with the code editor or may be used as a plug-in to the code editor. Next, in S412, at least one element 502 is received in a source code file 350. It is noted that the code and code comments may be edited by anyone with access to the file (e.g., developer, architect, information developer, etc.). It is also noted that initially, the file may include comments without any code, or code without comments. In the case of code without comments, the comments may be added line by line. As used herein the element 502 may be at least a portion of a line of source code 504 and a comment 506.

In S414, an editor 355 is initiated in response to the received at least one element 502. In embodiments, the editor 355 is initiated by receipt, from the user, of the character that indicates a comment in the corresponding programming language. For example, when the programming language is JAVA® and the user enters the characters "//" or "/*", this character entry initiates a code comment, to our system this indicates that a code comment starts and so the documentation edit mode starts.

Figure 5B:
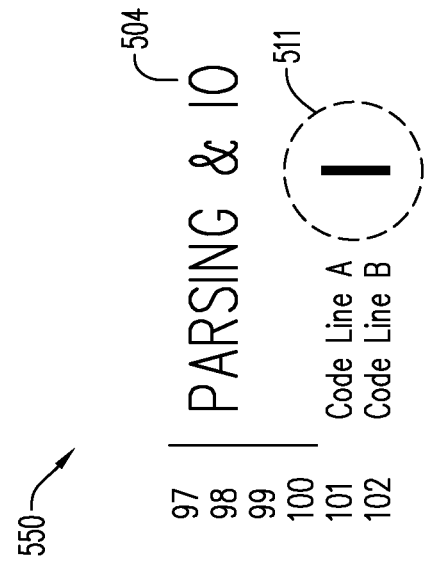
FIGS. 5A and 5B are a user interface according to some embodiments.

Then, in S416, it is determined, by the editor 355, whether the element 502 is the at least a portion of a line of source code 504 and the comment 506. In one or more embodiments, the determination may be based on the text entered into the source code file 350. As used herein, the "source code file" may refer to the single document including both the source code and the comments. The IDE 345 may include one or more libraries 360 to support the different programming languages. Each library 360 may include the terms and/or syntax that indicate a comment. As a non-exhaustive example, and described above, the library may include, for C++, JAVA®, JavaScript®, 1. /* block comment*/—which may be used to add multi-line descriptions, and 2. //single line text—which may be used to add single line descriptions. The library 360 may also include other characters, e.g. the colon in SQL, hashtag in Shellscripting, semicolon in Assembly, period in Windows Batch-Skripting, etc. may be used to introduce comments, which may be equivalent with //. When the editor 355 determines, in S416 that the element 502 is at least a portion of a line of source code 504, a code edit/documentation display mode 365 is initiated in S418 via the renderer 370. In the code edit/documentation display mode 365, the source code 504 may be displayed in the user interface 550 (FIG. 5B). While in the code edit/documentation display mode 365, the comments 506 may be displayed along with the lines of source code in S420. For example, as shown in FIG. 5B, the comment "PARSING & IO" 504, (where "IO" is "Input/Output") is displayed without the markings 508 (shown in FIG. 5A) that indicate the text is a comment. The comment 506 is also displayed including the formatting assigned to the text via the documentation edit mode 375 described below. The display of the comment in the code edit/documentation display mode 365 may be referred to as "interpreted markup," as the system 300 has analyzed the markup instructions input by the user in the documentation edit mode 375 and provided the interpretation of them in the code edit/documentation display mode 365. By displaying the comment 506 (e.g., FIG. 5B) with just the assigned formatting, the comment 506 is displayed more prominently and is visually set apart from the lines of source code 504, making it easier for a user to discern comments from code. In embodiments, the code edit/documentation display mode 365 and documentation edit mode 375 may occur at different times, or they may occur at the same time. In S422, the user may enter source code 504 in the source code mode user interface UI 550. Then, the process returns to S412, and the code comment module 340 monitors the received at least one element to determine whether it is at least a portion of a line of source code 504 or the comment 506. In one or more embodiments, a user may switch from the document display/code edit mode to the documentation edit mode 375 by clicking a cursor 511 in an area of code or in the area of documentation.

Figure 5A:
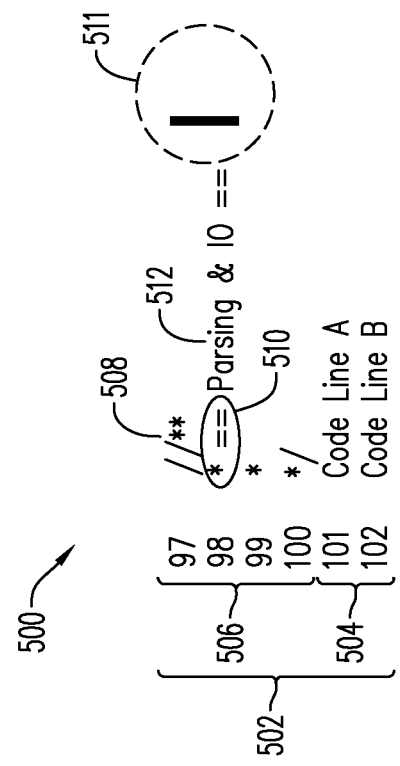
Figure 7:
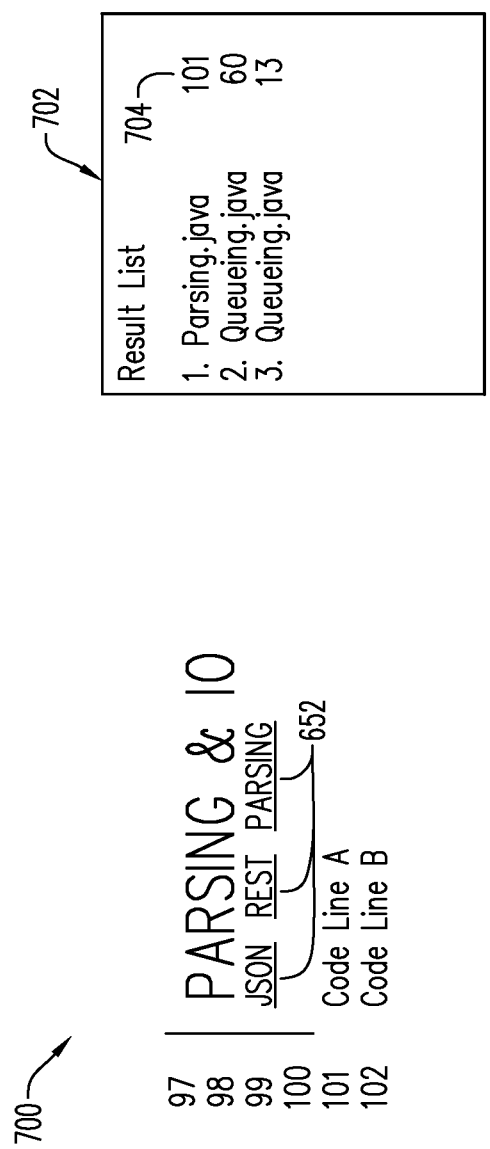
FIG. 7 is a user interface according to some embodiments.

When in S416, the editor 355 determines the element 502 is a comment 506, a documentation edit mode 375 is initiated in S424. In the documentation edit mode 375, the source code 504 and comments 506 may be displayed in the user interface 500 (FIG. 5A). In one or more embodiments, the user may write documentation comments, and have a markup language applied thereto. In one or more embodiments, editing the documentation may be done with Wiki Markup or with a What You See Is What You Get (WYSI-WYG) Editor. The markup may include at least one of bullet lists, font formatting, section emphasis, headlines, and any other suitable markup. Wiki Markup may be a non-exhaustive example of a markup language. Other markup languages include, but are not limited to, HTML, Markdown, DITA. In S426 at least one markup annotation may be received, indicating to the system the appropriate markup to assign to a comment, and in S428, one or more comments are received, wherein the comment is associated with source code, and may be modified per the markup. In one or more embodiments, S426 and S428 may be reversed. Annotations are part of comments and describe the parts that go beyond the text, including markup and tags. In one or more embodiments, at least one of the one or more comments describes (non-structure-related) functional details of the source code and structure-related details of the source code. The functional details include at least one of a usable library, compatibility, workflows, and any other suitable details. The documentation edit mode 375 may show the plain comment including the markup language 510 input by the user. For example, FIG. 5A shows the plain comment 512 "Parsing & IO" with the markup language 510 "==plain comment==". This markup language instructs the system to display the plain comment 512. In one or more embodiments, the editor 355 may detect if the user is editing the comment, and may automatically replace this comment with the respective markup syntax. As described above, in one or more embodiments, the editor 355 may detect this because the developer placed his cursor into the comment, and the displayed rendered text is replaced with the editable version, i.e., with the markup.

Next, the user may return to, and/or initiate, the code edit/documentation display mode 365, and the source code is displayed including the comments having the markup applied thereto, as shown, for example, in FIG. 5B. In one or more embodiments, the user may switch from the documentation edit mode 375 to the code edit/documentation display mode 365 by hovering the cursor 511 over the source code in the documentation edit mode 375 (FIG. 5A) or selecting the source code in the documentation edit mode (e.g., clicking on the code). In one or more embodiments, the location the user selected in one mode (e.g., Code Line A), is the location of the cursor 511 when the mode switches to the other mode. For example, if the user is in the documentation edit mode 375 and selects Code Line A, the mode switches to the code edit/documentation display mode 365, and the cursor 511 is at Code Line A.

Turning to FIGS. 6A and 6B, a user interface (UI) of a documentation edit mode 600 (FIG. 6A) and a documentation display mode 650 (FIG. 6B) are provided. One or more embodiments provide for tagging the comments automatically and manually. For example, in FIG. 6A, the code comment module 340 has analyzed the code 604 and determined that the developer included a REST API and JSON libraries (not shown) in the code edit/documentation display mode 365. In one or more embodiments, when, or in some instances before, the UI switches to the documentation edit mode 375, the module 340 may automatically tag the comments by adding these libraries as topic annotations or tags (e.g., "@JSON, @REST") 610 ("automatic tag") in the comment section. As used herein, "tag" and "annotation" may be used interchangeably. A tag may mark a topic. In one or more embodiments, the user may also manually add a tag 612 ("manual tag") to the comments by adding further topics (e.g., ("@PARSING") to improve the documentation, as this code segment may be about implementing a parser. FIG. 6B, shows how this documentation may be rendered in the code edit/documentation display mode 365, after leaving the documentation edit mode. As shown herein, the system's interpretation of the markup language results in the tags 610,612 being displayed as hyperlinks 652. In one or more embodiments, tags may be displayed as hyperlinks.

Continuing with the non-exhaustive example described above, FIG. 7 provides a user interface 700 showing the code edit/documentation display mode 365, including one or more tagged topics hyperlinks 652, as shown in FIG. 6B. In one or more embodiments, each tag may be selected (e.g., clicked). When the developer, or any other suitable party, clicks on a tag 652, a result list 702 may open that shows all the places in all source code files 350 contained in the repository that reference the topic of the tag. This feature may help the developer to get an overview of the topic and navigate to the different parts of all files in the code repository 380 (FIG. 3) that relate to that feature. In one or more embodiments, the module 340 may include a version control code repository 380, which stores a historical record of changes to the document. In the example shown herein, the user has selected the "parsing" tag 652. Based on that selection, the Parsing result list 702 is displayed showing the places in the code that reference "parsing" (e.g., 1 hit in Parsing.java, 1 hit in Queueing.java), and their respective line number 704 in the code. It is noted that the user may need to see where "parsing" is in different files to navigate the complete repository.

Figure 8:
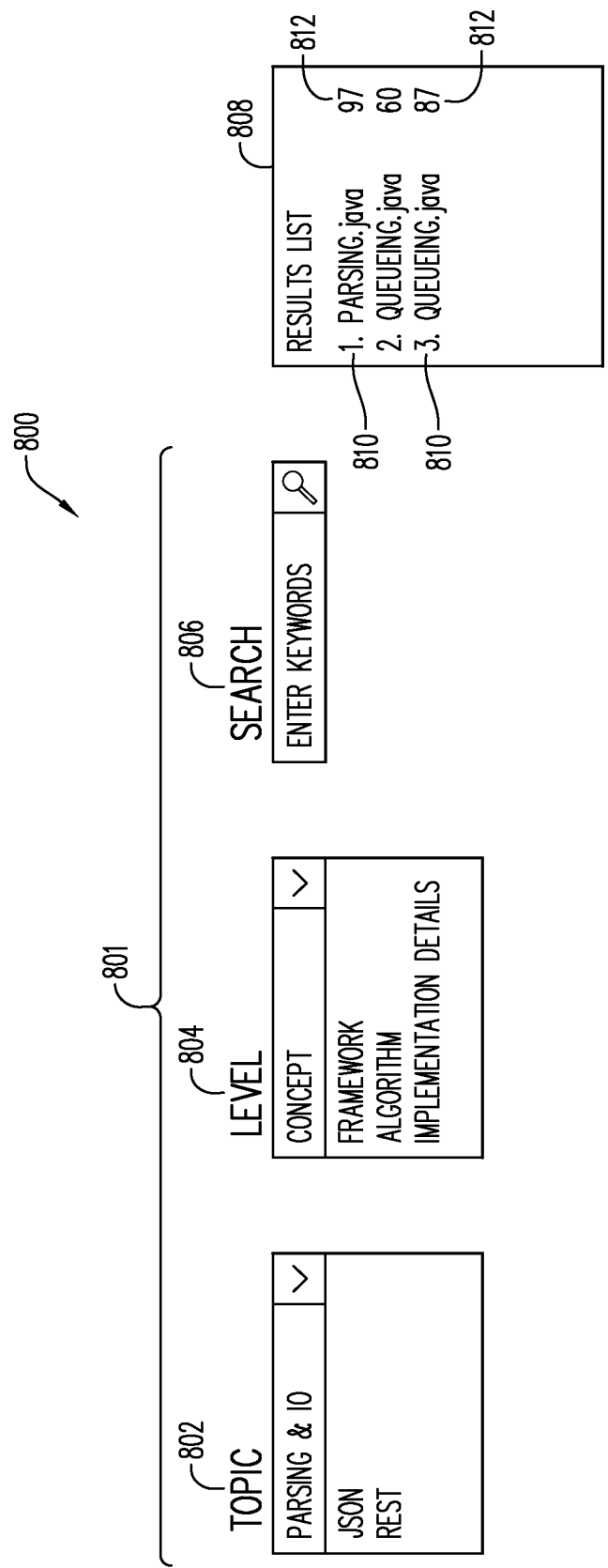
FIG. 8 is a user interface according to some embodiments.

In one or more embodiments, the user may navigate the code repository 380 by tagged topic, as described above with respect to FIG. 7, and/or may navigate the code repository 380 via other annotations or category levels, or other keyword searches. For example, FIG. 8 provides a user interface 800 to navigate the source code file 350. In one or more embodiments, this navigation user interface 800 may be provided whenever the user is in the code edit/documentation display mode 365, in response to a user selecting a navigation control (not shown) or any other suitable time. In one or more embodiments, the navigation UI 800 may include one or more filters 801 including, but not limited to, a topic or tag control 802, a category level control 804 and a keyword search control 806. While these controls 802, 804, 806 are shown herein with drop-down menus, any suitable control may be used (e.g., radio buttons, user-entry, etc.) Selection of any of the topic control 802, category level control 804, and keywork search control 806 may result in display of a result list 808. As described above with respect to FIG. 7, the result list 808 may include a list of all locations in the source code file 350 where all selected criteria fit, including topic, level, and keyword is present. In one or more embodiments, each entry of the result list is a link so that one can directly jump into the file to the right place. In one or more embodiments, the topic control 802 may include one or more tagged topics (e.g., Parsing & 10, JSON, REST) in the source code file 350. The category level control 804 may include one or more categories associated with the comments contained in the source code file 350 (e.g., concept, framework, algorithm, implementation details). As a non-exhaustive example, the comment is "here we describe how we sort the list with <algorithm>bubblesort</algorithm>" indicating that the comment is about an algorithm named bubblesort. Now the user can select "Algorithm" with control 804 to get a list of all algorithms documented in the source code files. The keyword search control 806 may be a free-form search field, whereby the user can enter any terms to search the full text of the source code file. As a non-exhaustive example, if the developer forgot to annotate "here we describe how we sort the list with the bubblesort algorithm" with <algorithm>, the developer may not be able to find it with control 804, but still with 806 when the developer enters "algorithm" there. In one or more embodiments, the user may enter/select information in each of the controls 802, 804, 806 to drill down to a more specific aspect of the source code file. In the example shown herein, the user selects "parsing" topic via topic control 802, "concept" category level via category level control 804, and may enter "customer data" into keyword search control 806. The result list 808 shows a list of source code file files 810 and the line numbers 812 indicating the location of the searched for terms per the controls 802, 804, 806. In one or more embodiments, each source code file in the list 808 may be a selectable link, that when selected may open the file at the indicated number line.

Figure 9:
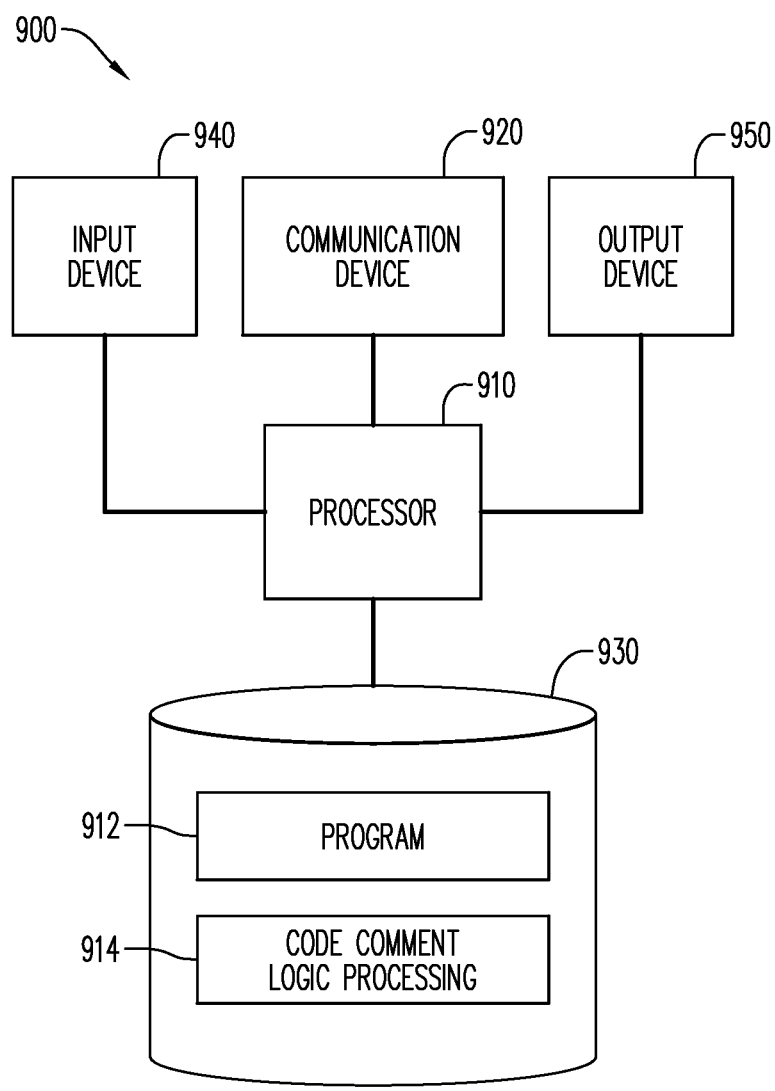
FIG. 9 is a block diagram of a system according to some embodiments.

FIG. 9 is a block diagram of apparatus 900 according to some embodiments. Apparatus 900 may comprise a general- or special-purpose computing apparatus and may execute program code to perform any of the functions described herein. Apparatus 900 may comprise an implementation of one or more elements of system 300. Apparatus 900 may include other unshown elements according to some embodiments.

Apparatus 900 includes a unified code processor 910 operatively coupled to communication device 920, data storage device 930, one or more input devices 940, one or more output devices 950 and memory 960. Communication device 920 may facilitate communication with external devices, such as application server 330. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to manipulate graphical user interfaces and to input information into apparatus 900. Output device(s) 950 may comprise, for example, a display (e.g., a display screen) a speaker, and/or a printer.

Data storage device/memory 930 may comprise any device, including combinations of magnetic storage devices (e.g., magnetic tape, hard disk drives and flash memory), optical storage devices, Read Only Memory (ROM) devices, Random Access Memory (RAM) etc.

The storage device 930 stores a program 912 and/or unified code platform logic 914 for controlling the processor 910. It is noted that program 912 and/or unified code platform logic 914 may also be stored and executed from an application server or from any other environment (e.g., software architecture) that can execute software instructions. The processor 910 performs instructions of the programs 912, 914, and thereby operates in accordance with any of the embodiments described herein, including but not limited to process 400. The executable instructions of the programs 912, 914 represent the executable instructions of the software architecture, including implementation of the methods, modules, subsystems and components and so forth described herein and may also include memory and/or storage modules . . . etc.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 300 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
a code comment module;
a unified code processor in communication with the code comment module and operative to execute processor-executable process steps to cause the system to:
receive initiation of an integrated development environment program;
receive at least one element, wherein the at least one element includes one or more characters;
initiate an editor in response to the received one or more characters;
determine, via the editor, the received one or more characters are indicative of a comment;
receive a markup annotation, wherein the markup annotation is an instruction to apply a particular format to one or more comments to distinguish the one or more comments;
receive one or more comments to be formatted by the received markup annotation;
assign the markup annotation to the received one or more comments;
format the received comments based on the received markup annotation; and
display the formatted comment.

2. The system of claim 1, wherein the markup annotation indicates the existence of the comment without displaying the comment.

3. The system of claim 1, wherein initiation of the editor is source code language independent.

4. The system of claim 1, wherein at least one of the one or more comments describes non-structure-related functional details of a source code and structure-related details of the source code.

5. The system of claim 4, wherein the functional details include at least one of usable libraries, compatibilities, workflows.

6. The system of 1, wherein the at least one markup annotation includes at least one of bullet lists, font formatting, section emphasis, headlines.

7. The system of claim 1, wherein the one or more comments are displayed in a plain markup in a documentation edit mode and in an interpreted markup in a code edit/documentation display mode.

8. The system of claim 1, further comprising processor-executable process steps to cause the system to:
display the at least one element including the formatted comment in a code edit/documentation display mode;
receive selection of a filter category; and
display the at least one element including the formatted comment based on the received filter category selection.

9. The system of claim 1, further comprising processor-executable process steps to cause the system to:
add a tag to the one or more comments, wherein the addition is one of automatic or manual.

10. The system of claim 9, further comprising:
a code repository including one or more source code files, wherein the at least one element is received in a first source code file, and wherein the system further comprises processor-executable process steps to cause the system to:
receive selection of the tag;
generate a result list based on selection of the tag, wherein the result list lists all of the locations in the code repository that reference the tag.

11. The system of claim 10, further comprising processor-executable process steps to cause the system to:
navigate the code repository via at least one of the tag, a category level of a keyword search.

12. A computer-implemented method supported with at least one processor having thereon memory-stored executable instructions which, when executed by the processor, cause the processor to perform the method, comprising:
receiving initiation of an integrated development environment program;
receiving at least one element, wherein the at least one element includes one or more characters;
initiating an editor in response to the received one or more characters;
determining, via an editor, the received one or more characters are indicative of a comment;
receiving a markup annotation, wherein the markup annotation is an instruction to apply a particular format to one or more comments to distinguish the one or more comments;
receiving one or more comments to be formatted by the received markup annotation;
assigning the markup annotation to the received one or more comments;
formatting the received comments based on the received markup annotation; and
displaying the formatted comment.

13. The method of claim 12, wherein initiation of the editor is source code language independent.

14. The method of claim 12, wherein at least one of the one or more comments describes non-structure-related functional details of a source code and structure-related details of the source code.

15. The method of claim 12, wherein the one or more comments are displayed in a plain markup in a documentation edit mode and an interpreted markup in a code edit/documentation display mode.

16. The method of claim 12, further comprising:
displaying the at least one element including the formatted comment in a code edit/documentation display mode;
receiving selection of a filter category; and
displaying the at least one element including the formatted comment based on the received filter category selection.

17. A non-transitory computer-readable medium storing program code, the program code executable by a computer system to cause the computer system to:
receive initiation of an integrated development environment program;
receive an element, wherein the element is one of a line of source code and a first comment;
initiate an editor in response to the received element;
determine, via the editor, the received element is indicative of a comment;
receive a markup annotation, wherein the markup annotation is an instruction to apply a particular format to one or more comments to distinguish the one or more comments in the source code;
receive one or more second comments to be formatted by the received markup annotation;
assign the markup annotation to the received one or more second comments;
format the received one or more second comments based on the received markup annotation; and
display the formatted comment.

18. The medium of claim 17, wherein initiation of the editor is source code language independent.

19. The medium of claim 17, wherein the one or more comments are displayed in a plain markup in a documentation edit mode and an interpreted markup in a code edit/documentation display mode.

20. The medium of claim 17, further comprising program code to:
add a tag to the one or more comments, wherein the addition is one of automatic or manual.

* * * * *

UNITED STATES PATENT AND TRADEMARK OFFICE
CERTIFICATE OF CORRECTION

PATENT NO. : 10,635,855 B1
APPLICATION NO. : 16/214618
DATED : April 28, 2020
INVENTOR(S) : Axel Schroeder et al.

Page 1 of 1

It is certified that error appears in the above-identified patent and that said Letters Patent is hereby corrected as shown below:

In the Claims

Column 1, Line 40, Claim 1, should read:
1. A system comprising:
    a code comment module;
    a unified code processor in communication with the code comment module and operative to execute processor-executable process steps to cause the system to:
        receive initiation of an integrated development environment program;
        receive at least one element, wherein the at least one element includes one or more characters;
        initiate an editor in response to the received one or more characters;
        determine, via the editor, the received one or more characters are indicative of a comment;
        receive a markup annotation, wherein the markup annotation is an instruction to apply a particular format to one or more comments to distinguish the one or more comments;
        receive one or more comments to be formatted by the received markup annotation;
        assign the markup annotation to the received one or more comments;
        format the received comments based on the received markup annotation; and
        display the formatted comment.

Signed and Sealed this
Ninth Day of June, 2020

Andrei Iancu
*Director of the United States Patent and Trademark Office*